Patented Mar. 12, 1940

2,193,624

UNITED STATES PATENT OFFICE 2,193,624

METHOD OF RECLAIMING RUBBER

Benjamin S. Garvey, Akron, Ohio, assignor to The B. F. Goodrich Company, New York, N. Y., a corporation of New York No Drawing. Application April 19, 1938, Serial No. 202,889

16 Claims. (Cl. 260—720)

This invention relates to the manufacture of reclaimed rubber, and particularly to a class of materials which are extraordinarily effective as reclaiming agents.

It is well known that vulcanized rubber articles such as pneumatic tire casings, solid rubber tires, inner tubes, boots, shoes, airbags, mechanical goods, etc. may be treated in various ways to return the rubber to a state in which it can be reused, which processes are generally called "reclaiming." Though several processes of reclaiming rubber are known, the changes which take place in the structure are not understood. The reclaimed product is readily distinguishable from vulcanized rubber, however, for it can be milled, compounded and vulcanized in much the same manner as unvulcanized rubber.

The process of this invention is carried out by heating, preferably with agitation, vulcanized rubber with a thiophenol. The vulcanized rubber, usually scrap rubber which may or may not contain fabric, is ground, shredded, or otherwise subdivided before subjecting to the reclaiming process. The reclaiming agent is usually incorporated in the ground scrap in proportions preferably varying from about 0.1 to 10%. The ground scrap may then be treated by any of the well known processes, e. g., the digestor process wherein the rubber is heated and agitated in the presence of the reclaiming agent and water or other liquid, or the heater process wherein the rubber is heated in open steam in the presence of the reclaiming agent. If it is desired to reclaim small amounts of rubber, this may be accomplished by masticating the ground scrap with the reclaiming agent on a hot mill or in a heated internal mixer. Larger batches are produced if the ground scrap and the reclaiming agent are mixed in a Gordon plasticator or similar apparatus. By employing different reclaiming agents in varying amounts under different conditions, the character of the product may be varied at will from a reclaimed rubber which will barely knit on a mill to a sticky paste which flows at room temperatures, as will hereafter be shown.

Example 1

A mixture of coarsely ground tube scrap (ground to pass about a 10 mesh screen) 100 gms., thiophenol 8 gms., and water 500 c. c. were refluxed in a flash for six hours. The liquid was poured off, and the residue was washed, dried and milled until it was a homogeneous mass. The product was reclaimed rubber of good quality. When it was dissolved in benzene and filtered through cheesecloth, only a few unreclaimed pieces remained.

Example 2

A mixture of coarsely ground tube scrap 100 gms., para thiocresol 10 gms. and water 500 c. c. was refluxed for 8 hours. When the product was separated from the liquid, washed, dried, and milled, there was obtained a high quality reclaim which was much more tacky than the product obtained in the previous sample.

Example 3

100 gms. of coarsely ground tube scrap were placed in a beaker which was in turn placed in a larger can containing 5 gms. of para thiocresol. The can was placed in an 140° C. oven for 12 hours. The top half of the reclaimed rubber in the beaker was a very viscous liquid which just flowed at room temperature, while the rest was a tacky solid which could be milled.

Example 4

A mixture containing coarsely ground inner tube scrap 500 grams, para thiocresol 15 gms. and water 2500 c. c. was refluxed for 8 hours, washed, dried and homogenized on a mill. A rubber composition containing 100 parts by weight of this reclaim, sulfur 3 parts, zinc oxide 5 parts, lauric acid 1 part and a rubber master batch containing 10% mercaptobenzothiazole 2.5 parts. When this composition was cured at 275° F. at varying times, the following tensiles and elongations were obtained:

| Minutes cured | Tensile, lbs./sq. in. | Elongation, percent |
|---|---|---|
| 20 | 1,150 | 640 |
| 30 | 1,200 | 610 |
| 45 | 1,000 | 530 |
| 60 | 980 | 510 |

The cure obtained in 20 minutes is much better than those ordinarily obtained with reclaimed rubber. The tear resistance of the vulcanized stocks was good and they looked and felt very much like products prepared from crude rubber.

Example 5

A mixture containing coarsely ground tube scrap 100 gms., thioresorcinol 5 gms. and water 500 c. c. was refluxed for 12 hours. The product, after being washed, dried and milled, was a reclaim having excellent properties.

Example 6

Another rather tacky product was obtained by refluxing a mixture containing coarsely ground tube scrap 100 gms., thio-beta-naphthol 5 gms., and water 500 c. c. for 12 hours and washing, drying and milling the product.

Example 7

A mixture containing coarsely ground tube scrap 200 gms., para-thiocresol 10 gms., sodium hydroxide 20 gms., and water 500 c. c. was refluxed for 24 hours. A good reclaim was obtained by washing and drying the product and milling it for 20 minutes.

Example 8

A mixture containing coarsely ground tube scrap 2,000 gms., para-thiocresol 60 gms., and water 3 gallons was placed in a digestor provided with an agitator and digested for 12 hours at a steam pressure of 30 lbs./sq. in. A good reclaim similar to the product of Example 8 was obtained when the product was washed, dried and milled.

Example 9

A mixture of coarsely ground tube scrap 200 grams, parathiocresol 10 grams, and ethyl alcohol 200 c.c. was placed in a tray and heated for 9 hours in open steam under a pressure of 100 lbs./sq. in. The product was a very tacky reclaim of good quality.

The foregoing examples illustrate the wide range of conditions which can be used to reclaim rubber by the process of this invention and the variation obtainable in the character of the products. The following examples show the applications of para thiocresol to the two most important reclaiming processes to obtain products which in general have the greatest utility.

Example 10

A mixture comprising coarsely ground tube scrap 1000 grams, para thiocresol 10 grams, and ethyl alcohol 200 c.c. was spread out in pans and placed in a heater for 6 hours in live steam under a pressure of 100 lbs./sq. in. The product was washed, dried, and milled. A reclaim of excellent quality was obtained. It was practically completely soluble in benzene and it produced compositions having good tensile strength and elongation when it was compounded and cured.

Example 11

A mixture comprising coarsely ground tube scrap 1000 grams, para thiocresol 10 grams, and water 1.5 gals. was heated for 12 hours in a digestor provided with an agitator under a steam pressure of 100 lbs./sq. in. When the product was washed and dried an excellent reclaim similar to the product of Example 10 was produced.

Though ground tube scrap has been used in the specific examples, any other kind of vulcanized rubber may be reclaimed by the same process. If the ground scrap contains fabric, the reclaiming may be effected in the same manner. If it is desired to remove the fabric, the reclaim may be dissolved in an appropriate solvent such as benzene and filtered or screened. If desired, the vulcanized rubber may first be subjected to the well known acid process to destroy the fabric, and then reclaimed with thiophenols. For many purposes, however, reclaim containing the fabric is desirable, and no treatment to remove the fabric is necessary.

Although the products of this invention usually are sufficiently soft and plastic, suitable softeners or plasticizers such as oils, resins, bitumens or the like may be added to the composition before heating in the manner which is customary in the art.

The specific examples employ reclaiming agents which are particularly suited to commercial production, but the invention is by no means limited thereto. Many other thiophenols such as para-xenyl mercaptan, ortho- or meta-thiocresol para-hydroxy thiophenol, thio-alpha-naphthol, etc. may also be used as reclaiming agents. The term "a thiophenol" is accordingly used in a generic sense to include aromatic mercaptans and polymercaptans, while the term "thiophenol" without the article means phenyl mercaptan. Salts of the thiophenols, such as the sodium salt formed in the composition in Example 8, which function in the same manner as the free compounds are also included within the scope of this invention.

Although I have herein disclosed specific examples of my invention, I do not intend to limit myself solely thereto, for it is obvious that many modifications such as substituting equivalent materials and varying the conditions of temperature and pressure and amounts of material used are within the spirit and scope of the invention as defined in the appended claims.

I claim:

1. The process of reclaiming rubber which comprises heating at at least about 100° C. ground vulcanized scrap in the presence of a thiophenol.

2. The process of reclaiming rubber which comprises heating in open steam ground vulcanized scrap in the presence of a thiophenol.

3. The process of reclaiming rubber which comprises heating in open steam ground vulcanized scrap in the presence of from 0.1 to 10% of a thiophenol.

4. The process of reclaiming rubber which comprises heating in open steam ground vulcanized scrap in the presence of from 0.1 to 10% of thiophenol.

5. The process of reclaiming rubber which comprises heating at at least about 100° C. ground vulcanized scrap in the presence of thiophenol.

6. The process of reclaiming rubber which comprises boiling with agitation a mixture of ground vulcanized scrap, a thiophenol, and water.

7. The process of reclaiming rubber which comprises boiling with agitation a mixture of ground vulcanized scrap from 0.1 to 10% of a thiophenol, and water.

8. The process of reclaiming rubber which comprises boiling with agitation a mixture of ground vulcanized scrap, a softener from 0.1 to 10% of a thiophenol, and water.

9. The process of reclaiming rubber which comprises boiling with agitation a mixture of ground vulcanized scrap, thiophenol, and water.

10. The process which comprises boiling with agitation a mixture of ground vulcanized scrap, from 0.1 to 10% of thiophenol, and water.

11. The process which comprises boiling with agitation a mixture of ground vulcanized scrap a softener, from 0.1 to 10% of thiophenol, and water.

12. The process of reclaiming rubber which comprises heating at at least about 100° C. ground vulcanized scrap in the presence of a thiocresol.

13. The process of reclaiming rubber which comprises heating at at least about 100° C. ground vulcanized scrap in the presence of para thiocresol.

14. The process of reclaiming rubber which comprises boiling with agitation a mixture of ground vulcanized scrap, para thiocresol, and water.

15. The process of reclaiming rubber which comprises boiling with agitation a mixture of ground vulcanized scrap, from 0.1 to 10% of para thiocresol, and water.

16. The process of reclaiming rubber which comprises heating at at least about 100° C. vulcanized scrap in the presence of from 0.1 to 10% of para thiocresol.

BENJAMIN S. GARVEY.